(12) United States Patent
Kato

(10) Patent No.: US 10,632,904 B2
(45) Date of Patent: Apr. 28, 2020

(54) SYSTEM FOR DETECTING SURROUNDING CONDITIONS OF MOVING BODY

(71) Applicant: PIONEER CORPORATION, Kawasaki-shi, Kanagawa (JP)

(72) Inventor: Masahiro Kato, Kawasaki (JP)

(73) Assignee: PIONEER CORPORATION, Kawasaki-Shi, Kanagawa (JP)

( * ) Notice: Subject to any disclaimer, the term of this patent is extended or adjusted under 35 U.S.C. 154(b) by 0 days.

(21) Appl. No.: 16/119,840

(22) Filed: Aug. 31, 2018

(65) Prior Publication Data

US 2018/0370426 A1 Dec. 27, 2018

Related U.S. Application Data

(63) Continuation of application No. 16/034,257, filed on Jul. 12, 2018, now Pat. No. 10,384,596, and a
(Continued)

(51) Int. Cl.
*B60Q 1/00* (2006.01)
*B60Q 1/46* (2006.01)
(Continued)

(52) U.S. Cl.
CPC .......... *B60Q 1/46* (2013.01); *B60Q 1/00* (2013.01); *B60Q 1/26* (2013.01); *B60Q 1/34* (2013.01); *B60Q 1/44* (2013.01); *B60Q 3/16* (2017.02); *B60Q 3/283* (2017.02); *B60Q 3/80* (2017.02); *B60Q 3/82* (2017.02); *B60Q 9/008* (2013.01); *B60Q 1/02* (2013.01); *B60Q 3/745* (2017.02)

(58) Field of Classification Search
CPC .................... B60Q 1/02; B60Q 1/34

USPC .......................................... 315/77; 340/815.4
See application file for complete search history.

(56) References Cited

U.S. PATENT DOCUMENTS 4,626,850 A 12/1986 Chey
4,694,295 A 9/1987 Miller et al.
(Continued)

FOREIGN PATENT DOCUMENTS

JP S62059880 A 3/1987
JP S63195045 A 8/1988
(Continued)

OTHER PUBLICATIONS

International Search Report and Written Opinion for related International Application No. PCT/JP2011/058803 dated Jul. 12, 2011; English translation of ISR provided; 8 pages.

*Primary Examiner* — Thuy V Tran
(74) *Attorney, Agent, or Firm* — Procopio, Cory, Hargreaves & Savitch LLP

(57) ABSTRACT

A system for detecting a surrounding condition relative to a body is provided. The system comprises a light-emitter, a sensor for detecting the surrounding condition, and a controller for changing a state of the light-emitter when the sensor detects a change of a condition at a position forward of the body. This system forcibly changes the state of at least one of a plurality of lighting devices (change from an unlit state to a lighting state or a blinking state, change in the emission color, or change in the luminance) installed inside the moving body, if an object to which attention must be paid during traveling of the moving body is detected in the surroundings of the moving body.

20 Claims, 14 Drawing Sheets

Related U.S. Application Data continuation of application No. 16/034,286, filed on Jul. 12, 2018, said application No. 16/034,257 is a continuation of application No. 15/711,988, filed on Sep. 21, 2017, said application No. 16/034,283 is a continuation of application No. 15/711,988, filed on Sep. 21, 2017, which is a continuation of application No. 15/489,174, filed on Apr. 17, 2017, now Pat. No. 9,802,532, which is a continuation of application No. 14/110,118, filed as application No. PCT/JP2011/058803 on Apr. 7, 2011, now Pat. No. 9,649,972.

(51) Int. Cl.

| | | |
|---|---|---|
| *B60Q 3/82* | (2017.01) | |
| *B60Q 3/80* | (2017.01) | |
| *B60Q 3/16* | (2017.01) | |
| *B60Q 9/00* | (2006.01) | |
| *B60Q 3/283* | (2017.01) | |
| *B60Q 1/26* | (2006.01) | |
| *B60Q 1/34* | (2006.01) | |
| *B60Q 1/44* | (2006.01) | |
| *B60Q 3/74* | (2017.01) | |
| *B60Q 1/02* | (2006.01) | |

(56) References Cited

U.S. PATENT DOCUMENTS

| | | | |
|---|---|---|---|
| 4,967,319 A | 10/1990 | Seko et al. | |
| 6,072,391 A * | 6/2000 | Suzuki | B60K 35/00 340/468 |
| 6,420,975 B1 | 7/2002 | DeLine et al. | |
| 6,470,273 B2 | 10/2002 | Halsted et al. | |
| 6,774,988 B2 | 8/2004 | Stam et al. | |
| 7,104,664 B2 | 9/2006 | Sugimoto et al. | |
| 7,477,976 B2 | 1/2009 | Horii et al. | |
| 8,045,760 B2 | 10/2011 | Stam et al. | |
| 8,542,129 B2 | 9/2013 | Taniguchi et al. | |
| 8,648,535 B2 | 2/2014 | Tatara | |
| 8,862,380 B2 * | 10/2014 | Jung | A61B 3/113 340/435 |
| 2004/0114379 A1 | 6/2004 | Miller et al. | |
| 2004/0114381 A1 | 6/2004 | Salmeen et al. | |
| 2006/0017583 A1 | 1/2006 | Davenport et al. | |
| 2008/0101077 A1 | 5/2008 | Watanabe | |
| 2009/0058621 A1 | 3/2009 | Yen | |
| 2010/0214791 A1 | 8/2010 | Schofield | |
| 2012/0314434 A1 | 12/2012 | Park et al. | |
| 2013/0039080 A1 | 2/2013 | Yamazaki et al. | |
| 2013/0051042 A1 | 2/2013 | Nordbruch | |
| 2013/0128599 A1 | 5/2013 | Park et al. | |
| 2013/0155704 A1 | 6/2013 | Takagaki | |
| 2014/0056012 A1 | 2/2014 | Yamazaki | |
| 2014/0069015 A1 | 3/2014 | Salter et al. | |
| 2014/0071702 A1 | 3/2014 | Faber et al. | |
| 2014/0098551 A1 | 4/2014 | Krauss et al. | |
| 2014/0118130 A1 | 5/2014 | Chang et al. | |
| 2014/0169010 A1 | 6/2014 | Imaeda | |
| 2014/0218946 A1 | 8/2014 | Fritz | |
| 2014/0350836 A1 | 11/2014 | Stettner et al. | |
| 2014/0355280 A1 | 12/2014 | Fujiyoshi | |
| 2015/0003087 A1 | 1/2015 | Futamura et al. | |
| 2015/0042225 A1 | 2/2015 | Fukayama | |
| 2015/0042226 A1 | 2/2015 | Hibino | |
| 2015/0051797 A1 | 2/2015 | Ehlgen et al. | |
| 2015/0062937 A1 | 3/2015 | Kasai et al. | |
| 2015/0077826 A1 | 3/2015 | Beckman | |
| 2015/0081168 A1 | 3/2015 | McWithey et al. | |
| 2015/0105976 A1 | 4/2015 | Shikii et al. | |
| 2015/0109450 A1 | 4/2015 | Walker | |
| 2015/0202939 A1 | 7/2015 | Stettner et al. | |
| 2015/0206439 A1 | 7/2015 | Marsden et al. | |
| 2015/0239392 A1 | 8/2015 | Mizuno et al. | |
| 2015/0241013 A1 | 8/2015 | Mochizuki et al. | |
| 2015/0242953 A1 | 8/2015 | Suiter | |
| 2015/0251586 A1 | 9/2015 | Imaeda et al. | |
| 2015/0324972 A1 | 11/2015 | Hayakawa et al. | |
| 2015/0336500 A1 | 11/2015 | Herntrich et al. | |
| 2015/0342007 A1 | 11/2015 | Anderson et al. | |
| 2016/0297356 A1 | 10/2016 | Dellock et al. | |
| 2017/0162047 A1 | 6/2017 | Garcia Lopez | |

FOREIGN PATENT DOCUMENTS

| | | |
|---|---|---|
| JP | 2000285394 A | 10/2000 |
| JP | 2003291689 A | 10/2003 |
| JP | 2005018235 A | 1/2005 |
| JP | 2005047383 A | 2/2005 |
| JP | 2006172315 A | 6/2006 |
| JP | 2006192972 A | 7/2006 |
| JP | 2008158963 A | 7/2008 |
| JP | 2009009320 A | 1/2009 |
| JP | 2010092171 A | 4/2010 |
| WO | 2006064968 A1 | 6/2006 |
| WO | 2008087832 A1 | 7/2008 |

* cited by examiner

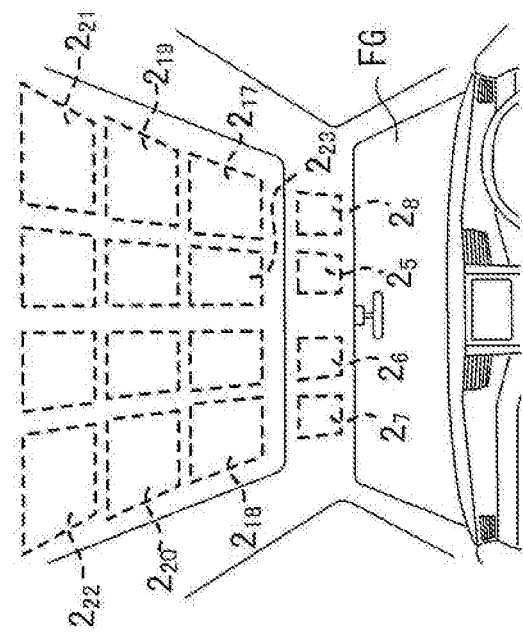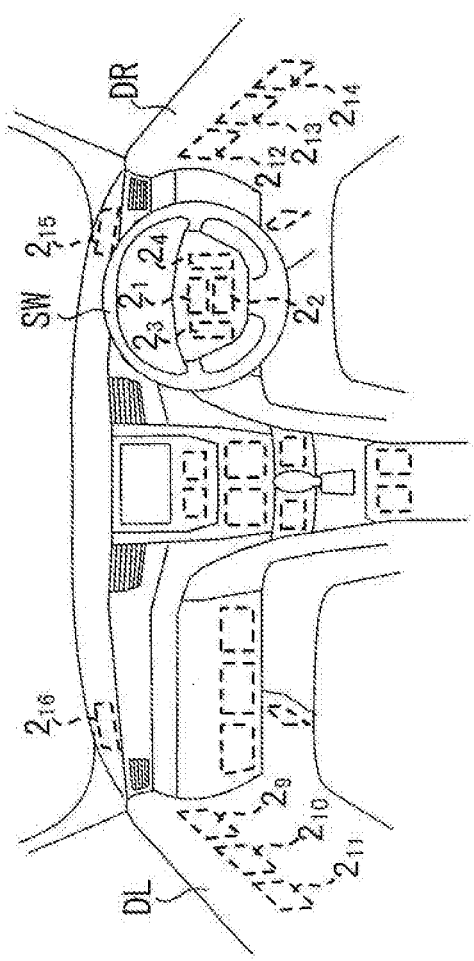

BLINK IN YELLOW

LIGHT IN WHITE

LIGHT IN YELLOW

LIGHT IN RED

LIGHT IN YELLOW

SYSTEM FOR DETECTING SURROUNDING CONDITIONS OF MOVING BODY

CROSS-REFERENCE TO RELATED APPLICATIONS

This application claims benefit under 35 USC § 120 as a Continuation of U.S. patent application Ser. No. 16/034,257, filed Jul. 12, 2018 (U.S. Pat. No. 10,384,596, issued Aug. 20, 2019), and U.S. patent application Ser. No. 16/034,283, filed Jul. 12, 2018, which are Continuations of U.S. patent application Ser. No. 15/711,988, filed Sep. 21, 2017, which is a Continuation of U.S. patent application Ser. No. 15/489,174, filed on Apr. 17, 2017 (U.S. Pat. No. 9,802,532, issued Oct. 31, 2017), which is a Continuation of U.S. patent application Ser. No. 14/110,118, filed on Dec. 17, 2013 (U.S. Pat. No. 9,649,972, issued May 16, 2017), which is a National Stage entry under 35 USC § 371 of PCT/JP2011/058803, filed Apr. 7, 2011, the contents of which are incorporated by reference in their entirety for all purposes.

TECHNICAL FIELD

The present invention relates to a system for detecting surrounding conditions of a moving body that notifies a moving body driver of conditions around the moving body, in particular, surrounding conditions that can be used to facilitate driving of the moving body.

BACKGROUND ART

To assist driving of a vehicle (i.e., moving body), a device that notifies a vehicle driver of surrounding conditions regarding traveling of the vehicle is known (see, for example, Patent Document 1). The device notifies the surrounding conditions by displaying on an on-vehicle display unit a video obtained by video-recording surroundings of the vehicle with an on-vehicle camera.

However, there is a problem; to check contents displayed on the on-vehicle display unit, the driver needs to move his visual line from a travelling direction of the moving body to the display unit.

Patent Document 1: Japanese Patent Application Kokai No. 2000-285394

SUMMARY OF THE INVENTION

Problems to be Solved by the Invention

The present invention has been developed in order to solve the above-described problem, and its object is to provide a system for detecting surrounding conditions of a moving body (e.g., a vehicle, a ship, and an aircraft) that can notify a driver of surrounding conditions of the moving body without causing the driver to move his visual line.

Solutions to the Problems

A system for detecting surrounding conditions of a moving body according to claim 1 is a system for detecting surrounding conditions of a moving body that includes a plurality of lighting devices (illumination devices), a detector, and a controller. The illumination devices are disposed in a room (cabin) of the moving body. Each of the illumination devices has a switch for switching between a lighting state (or a turn on state) and an unlit state (or a turn off state). The detector is configured to detect an object to which attention must be paid around the moving body. The controller is configured to change a state of at least one of the lighting devices upon detecting the attention-required object.

BRIEF DESCRIPTION OF THE DRAWINGS

FIGS. 2A and 2B show exemplary installation of illumination panels 2 mounted in a cabin of a vehicle or the moving body.

MODE FOR CARRYING OUT THE INVENTION

Figure 1:
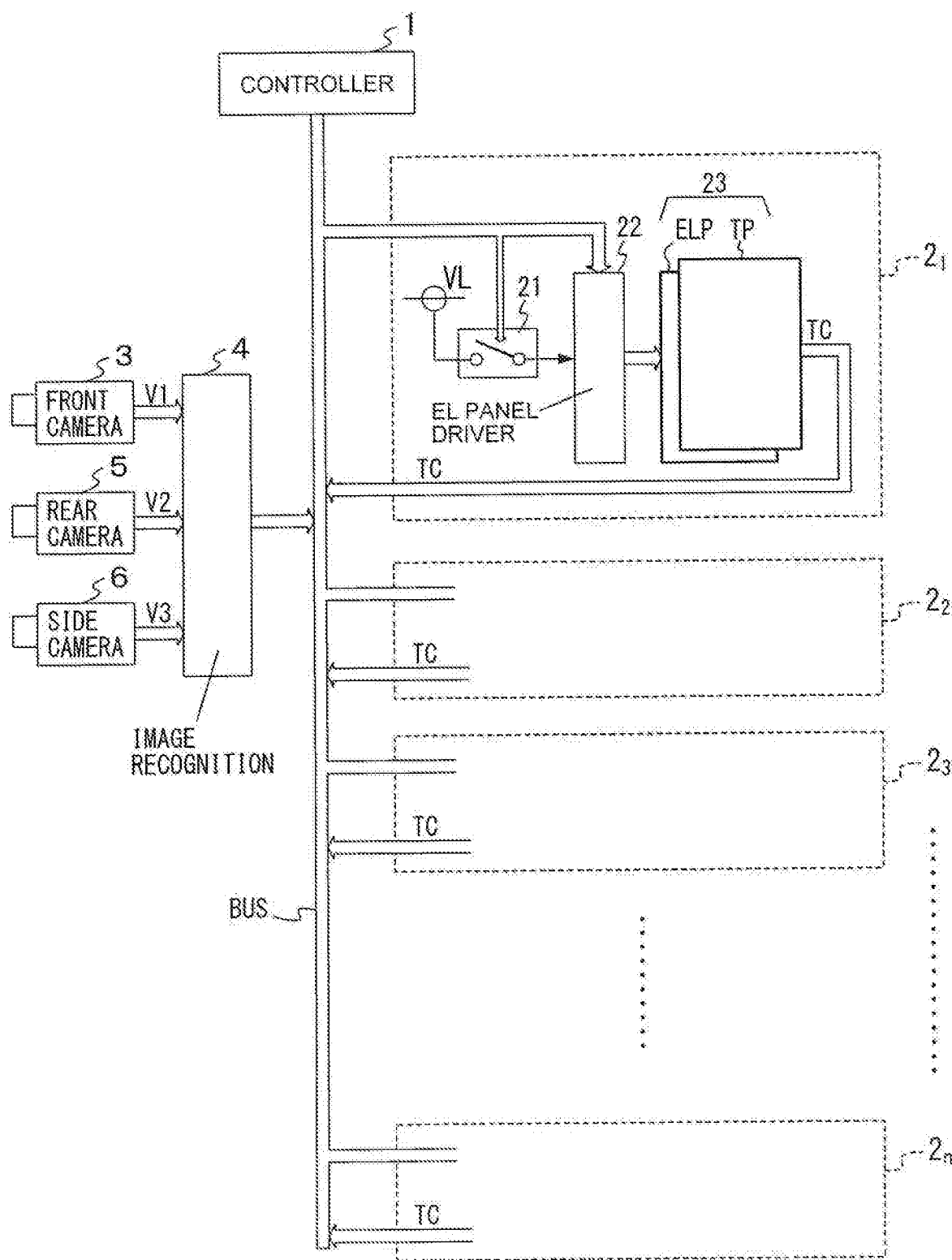
FIG. 1 is a block diagram of a system for detecting surrounding conditions of a moving body according to the present invention.

When a system for detecting surrounding conditions of a moving body according to the present invention detects a "pay attention" object to which attention must be paid during traveling, in the surroundings of the moving body, then the system forcibly changes a state of at least one illumination device among a plurality of illumination devices installed in a cabin of the moving body (change from a unlit state to a lighting or blinking state, change in emission color, or change in luminance). Accordingly, even if a driver of the moving body does not visually observe an attention-required object present near the moving body, a change in the state of the lighting device (illumination device) enters the driver's field of vision. This enables the driver to recognize that the attention-required object approaches the moving body or the moving body approaches the attention-required object. To this end, changed is the state of the illumination device(s) installed at a position corresponding to a direction where the attention-required object is present. This allows the moving body driver to recognize the direction where the attention-required object is present without moving the driver's visual line. In the case where the attention-required object is lighting of a rear lamp of a forward vehicle (the rear lamp may be a lamp assembly that includes at least one of a stop lamp, a backup lamp, a turn signal lamp, and a hazard warning lamp), an illumination panel (light-emitting panel) installed in front of a driver's seat is caused to light or blink (flash) in a color corresponding to a lighting color of the rear lamp assembly. Accordingly, even if the driver does not look straight the rear lamp assembly of the forward vehicle, the driver can recognize whether the lighting rear lamp assembly of the forward vehicle is the backup lamp, the stop lamp, the turn signal lamp, or the hazard warning lamp without moving the direction of his visual line. In the case where the attention-required object is a traffic light, the illumination panel installed above the driver's seat in the moving body is caused to light in a color corresponding to a lighting color of the traffic light. Accordingly, even if the driver does not look at the traffic light ahead, the driver can recognize the lighting color of the traffic light without moving the direction of his visual line. In the case where the attention-required object is an avoidance-required obstacle which the vehicle equipped with the surrounding condition detecting system must avoid, such as pedestrian, a bicycle, a wall, an edge stone, an obstruction, or an emergency vehicle, then an illumination panel installed in a direction that the avoidance-required obstacle is present is forced to light or blink. An emission color, luminance, and/or a blinking speed of the illumination panel are also altered according to a distance and a relative speed between the moving body and the avoidance-required obstacle. When the avoidance-required obstacle is an obstruction that hinders the traveling of the vehicle equipped with the surrounding condition detecting system, then the emission color and the luminance of the lighting panel (illumination panel) are changed according to a size of the obstruction. This allows the driver to intuitively recognize a hazard of the approaching avoidance-required obstacle.

Embodiments

FIG. 1 is a block diagram of a system configuration when a system for detecting surrounding conditions of a moving body according to the present invention is provided in a vehicle.

In FIG. 1, illumination panels $2_1$ to $2_n$ (n represents an integer equal to or more than two), each of which serves as a lighting device or an illumination device, are installed, for example, at a front panel in front of a driver's seat, a steering wheel SW, a console box, doors DL and DR in the vehicle as illustrated by the dashed lines shown in FIG. 2A and on the ceiling in the vehicle illustrated by the dashed lines shown in FIG. 2B, respectively. The illumination panels $2_1$ to $2_n$ are coupled to a controller 1 via a control bus BUS, respectively. A front camera 3, a rear camera 5, and a side camera 6 are also coupled to the controller 1 via the control bus BUS.

The illumination panels $2_1$ to $2_n$ have the same internal configuration.

When the controller 1 sends a lighting or a blinking command signal of a certain color (red, white, yellow, green, blue, purple, indigo or orange) to a lighting on/off switch 21 of an illumination panel 2 via the control bus BUS, the lighting on/off switch 21 turns on and allows a power supply voltage V1 to be supplied to an electroluminescence (EL) panel driver 22. When the controller 1 supplies an turn off command signal to the on/off switch 21 via the control bus BUS, the switch 21 turns off, and stops the supply of the power supply voltage V1 to the EL panel driver 22. The EL panel driver 22 generates various light emission drive voltages based on the lighting or blinking command signal of a desired color (red, white, yellow, green, blue, purple, indigo or orange) received from the controller 1 via the control bus BUS while the power supply voltage V1 is being supplied through the switch 21, and supplies the resulting light emission drive voltages to a touch-sensor-integrated EL panel 23. When, for example, the EL panel driver 22 receives a red lighting command signal from the controller 1, the EL panel driver 22 supplies a light emission drive voltage to the EL panel 23 to cause the EL panel to light in red. When the EL panel driver 22 receives a yellow blinking command signal from the controller 1, the EL panel driver 22 supplies a light emission drive voltage to the EL panel 23 to cause the EL pane 23 to blink in yellow.

Figure 3:
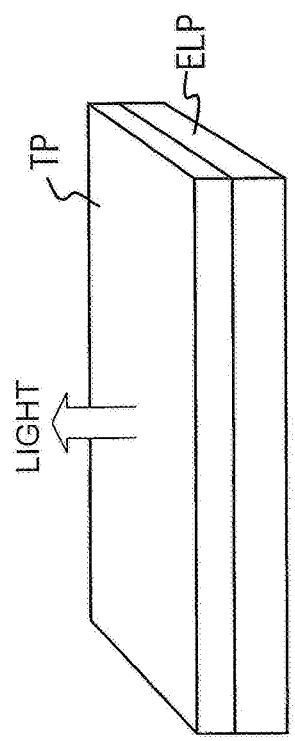
FIG. 3 is a perspective view of a schematic structure of a contact-sensor-integrated EL panel 23.

FIG. 3 is a perspective view illustrating a rough structure of the touch-sensor-integrated EL panel 23.

As shown in FIG. 3, the EL panel 23 includes a transparent touch sensor panel TP bonded on a light emitting face of an organic electroluminescence (EL) light emitting panel ELP.

The organic EL light emitting panel ELP as a plane EL light emitting element lights or blinks in an emission color corresponding to the light emission drive voltage supplied from the EL panel driver 22. The light is emitted to outside via the touch sensor panel TP. The organic EL light emitting panel ELP is in the off state (unlit state) when the light emission drive voltage is not supplied. The touch sensor panel TP is a switch that switches between lighting and extinction (no lighting) of the organic EL light emitting panel ELP. When a person touches a touch sensor face of the touch sensor panel TP, the touch sensor panel TP generates a contact detection signal TC to turn on or off the organic EL light emitting panel ELP while the contact is being made. The contact detection signal TC is supplied to the controller 1 via the control bus BUS.

With the above-described configuration, each of the illumination panels $2_1$ to $2_n$ lights or blinks in the emission color indicated by the lighting or blinking command signal that represents a desired color (red, white, yellow, green, blue, purple, indigo, or orange) received from the controller 1. When, for example, the controller 1 sends a white lighting command to the lighting panel $2_1$, the illumination panel $2_1$ emits a white light. When the controller 1 sends a white blinking command, the lighting panel $2_1$ blinks in white. When the controller 1 sends a red lighting command to the illumination panel $2_1$, the illumination panel $2_1$ emits a red light. When the controller 1 sends a red blinking command, the illumination panel $2_1$ blinks in red. Supply of a turn off command signal from the controller 1 can turn off each of the light-emitting panels $2_1$ to $2_n$. Each of the light-emitting panels $2_1$ to $2_n$ generates the contact detection signal TC each time the touch sensor panel TP is made contact. The contact detection signal TC is sent to the controller 1.

The front camera 3 is installed at a front portion of a vehicle exterior. The front camera 3 supplies an image signal V1, which is obtained by video-recording the scene forward of the vehicle, to an image recognition processor 4.

The rear camera 5 is installed at a rear portion of the vehicle exterior. The rear camera 5 supplies an image signal V2, which is obtained by video-recording the scene backward of the vehicle, to the image recognition processor 4.

The side cameras 6 are installed at lateral parts of the vehicle exterior, such as right and left side-view mirrors of the vehicle, respectively. The side cameras 6 supply image signals V3, which are obtained by video-recording the scene on both sides of the vehicle, to the image recognition processor 4.

The image recognition processor 4 performs an image recognition process on the image signals V1 to V3 to detect in these images an attention-required object that the driver needs to care during driving. The attention-required object is, for example, a lighting state of a rear lamp assembly of a forward vehicle, a traffic light, and an avoidance-required obstacle which the vehicle equipped with the surrounding condition detecting system must avoid. The avoidance-required obstacle is, for example, a pedestrian, a bicycle, an emergency vehicle, an obstruction that becomes an obstacle in traveling, a wall at a road with poor visibility, and an edge stone.

When light emission of the rear lamp assembly of a preceding vehicle is detected in an image obtained from the image signal V1, the image recognition processor 4 generates rear lamp detection data RD. The rear lamp detection data RD indicates whether the emission color of the rear lamp assembly is red, white, or yellow. The image recognition processor 4 supplies the rear lamp detection data RD to the controller 1 via the control bus BUS. When the emission color of the rear lamp assembly is yellow, that is, when a turn signal lamp or a hazard warning lamp is activated, direction indication information is included in the rear lamp detect ion data RD. The direction indication information indicates whether the rear lamp assembly is blinking only on the right side, blinking only on the left side, or blinking on both right and left sides.

When the traffic light is detected in the image obtained from on the image signal V1, the image recognition processor 4 generates traffic-light detection data SD. The traffic-light detection data SD indicates a lighting color of the traffic light. The image recognition processor 4 supplies the traffic-light detection data SD to the controller 1 via the control bus BUS. In the case where a traffic light shows (indicates, displays) a direction with an arrow, the image recognition processor 4 incorporates, in the traffic-light detection data SD, information representing a fact that this is an arrow indication and also representing the pointing direction of the arrow.

When a pedestrian or a bicycle is found in an image or images obtained from the image signals V1 to V3, the image recognition processor 4 generates pedestrian/bicycle detection data HD. The pedestrian/bicycle detection data HD indicates the direction of, distance to, and relative speed of the pedestrian or bicycle, and the data is supplied to the controller 1 via the control bus BUS.

When the image recognition processor 4 detects an attention-required road zone such as a road zone with poor visibility or a route in a parking area (parking lot) in the images derived from the image signals V1 to V3 and also detects an attention-required object, such as a wall, an edge stone, and another vehicle on the attention-required road, then the image recognition processor 4 generates attention-required zone detection data ED. The attention-required zone detection data ED includes information representing the direction of, distance to, and relative speed of the attention-required object. The image recognition processor 4 supplies the attention-required zone detection data ED to the controller 1 via the control bus BUS. The road zone with poor visibility is a zone where the vehicle equipped with the surrounding condition detecting system enters a wider road from a narrower road without effective right/left visibility due to, for example, a blockade, such as a house wall.

When the image recognition processor 4 detects an emergency vehicle such as a patrol car, a police car, an ambulance, and a fire engine in the images obtained from the image signals V1 to V3, the image recognition processor 4 generates emergency vehicle detection data QD. The emergency vehicle detection data QD indicates the direction of, distance to, and relative speed of the emergency vehicle. The image recognition processor 4 supplies the emergency vehicle detection data QD to the controller 1 via the control bus BUS.

When the image recognition processor 4 detects an obstruction on the road in the images obtained from the image signals V1 to V3, the image recognition processor 4 generates obstruction detection data GD. The obstruction detection data GD indicates the direction of, distance to, and a size of the obstruction. The image recognition processor 4 supplies the obstruction detection data GD to the controller 1 via the control bus BUS.

The controller 1 sends the turn on command (i.e., lighting command signal) or the turn off command to the illumination panel 2, which is a delivery source of the contact detection signal TC, in response to the contact detection signal TC received from the illumination panel $2_1$ to $2_n$. This allows the illumination panel 2 to be lighted by simply touching the light emitting face of the illumination panel 2 with a fingertip in the case where a person in the vehicle equipped with the surrounding condition detecting system needs interior lighting. Touching the light emitting face of the illumination panel 2 with the fingertip again turns off the illumination panel 2.

The controller 1 forces the light-emitting panel 2 to light or blink in order to notify the person in the vehicle of the surrounding conditions by performing the following surrounding condition notification control.

Figure 4:
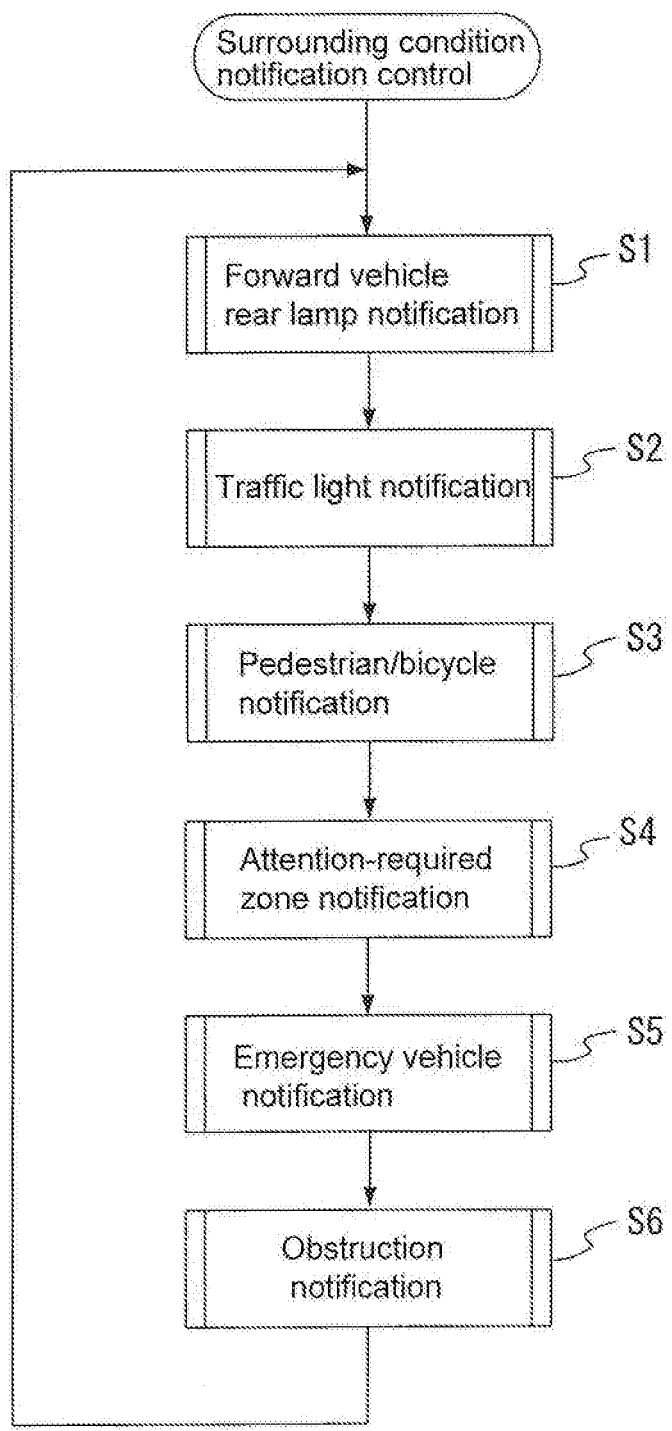
FIG. 4 is a flowchart illustrating a main flow of a surrounding condition notification control.

FIG. 4 is a flowchart illustrating a main flow of the surrounding condition notification control.

In FIG. 4, first, the controller 1 executes a forward vehicle rear lamp notification subroutine to notify the occupant in the vehicle equipped with the surrounding condition detecting system of a state of a rear lamp assembly of a vehicle traveling forward (Step S1). Next, the controller 1 executes a traffic light notification subroutine to notify the occupant in the vehicle equipped with the surrounding condition detecting system of a color emitted by a traffic light ahead (Step S2). Next, the controller 1 executes a pedestrian/bicycle notification subroutine to notify the occupant in the vehicle equipped with the surrounding condition detecting system of presence of a pedestrian and/or a bicycle around the vehicle equipped with the surrounding condition detecting system (Step S3). Next, the controller 1 executes an attention-required zone notification subroutine to notify the vehicle occupant of presence of an attention-required object, such as a wall, an edge stone, and another vehicle around the vehicle equipped with the surrounding condition detecting system (Step S4). Next, the controller 1 executes an emergency vehicle notification subroutine to notify the vehicle occupant of a fact that an emergency vehicle is approaching (Step S5). Next, the controller 1 executes an obstruction notification subroutine to notify the vehicle occupant of presence of an obstruction on the road (Step S6).

After the execution of Step S6, the controller 1 returns to Step S1 and repeats the processing of Steps S1 to S6.

Figure 5:
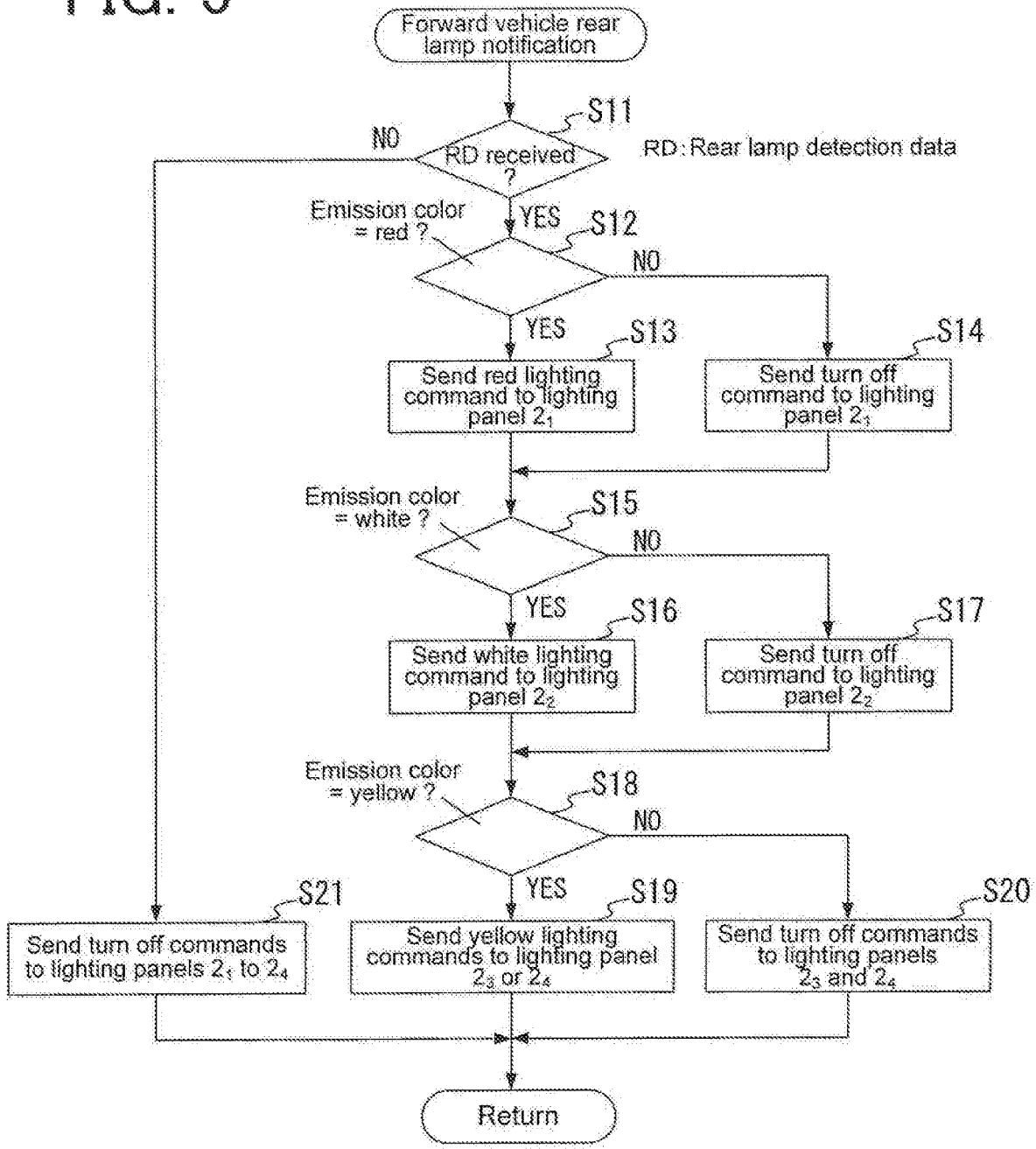
FIG. 5 is a flowchart illustrating a forward vehicle's rear lamp notification subroutine.

FIG. 5 is a flowchart showing the detail of the forward vehicle rear lamp notification subroutine executed in Step S1.

In FIG. 5, first, the controller 1 determines whether or not the rear lamp detection data RD has been received from the image recognition processor 4 (Step S11). When Step S11 determines that the rear lamp detection data RD is received, that is, when the rear lamp assembly of the vehicle traveling forward is lighting, then the controller 1 determines whether an emission color represented by the rear lamp detection data RD is red or not (Step S12). When Step S12 determines that the emission color of the rear lamp assembly is red, that is, when the stop lamp is lighting, then the controller 1 supplies a red lighting command signal to the illumination panel $2_1$ (Step S13). The red lighting command signal causes the illumination panel $2_1$, which is installed at the center of a steering wheel SW as shown in FIG. 2A, to light in red. On the other hand, when Step S12 determines that the emission color of the rear lamp assembly is not red, then the controller 1 supplies the turn off command signal to the illumination panel $2_1$ in order to turn off the illumination panel $2_1$ (Step S14). After the execution of Step S13 or S14, the controller 1 determines whether the emission color represented by the rear lamp detection data RD is white or not (Step S15). When it is determined in Step S15 that the emission color of the rear lamp assembly is white, i.e., it is determined that the backup lamp is lighting, then the controller 1 supplies a white lighting command signal to the illumination panel $2_2$ (Step S16). The white lighting command signal causes the illumination panel $2_2$, which is installed under the illumination panel $2_1$ at the center of the steering wheel SW as shown in FIG. 2A, to light in white. On the other hand, when Step S15 determines that the emission color of the rear lamp assembly is not white, then the controller 1 supplies the turn off command to the illumination panel $2_2$ in order to turn off the illumination panel $2_2$ (Step S17). After the execution of Step S16 or S17, the controller 1 determines whether the emission color represented by the rear lamp detection data RD is yellow or not (Step S18). When Step S18 determines that the emission color of the rear lamp assembly is yellow, i.e., when the turn signal lamp or the hazard warning lamp is activated, then the controller 1 supplies a yellow blinking command signal to the illumination panel 2 (Step S19). The yellow blinking command signal causes one of or both the illumination panels $2_3$ and $2_4$, which are installed at right and left of the illumination panel $2_1$ at the center of the steering wheel SW as shown in FIG. 2A, to blink. That is, in Step S19, when the direction indication information included in the rear lamp detection data RD indicates right, the controller 1 supplies the yellow blinking command signal to the illumination panel $2_4$. When the direction indication information indicates left, the controller 1 supplies the yellow blinking command signal to the illumination panel $2_3$. When the direction indication information indicates both right and left, the controller 1 supplies the yellow blinking command signal to the illumination panels $2_3$ and $2_4$. When Step S18 determines that the emission color of the rear lamp assembly is not yellow, then the controller 1 supplies the turn off command to the illumination panels $2_3$ and $2_4$ in order to turn off the illumination panels $2_3$ and $2_4$, respectively (Step S20). When Step S11 determines that the rear lamp detection data RD is not received, then the controller 1 supplies the turn off command signal to all the illumination panels $2_1$ and $2_4$ in order to turn off the illumination panels $2_1$ and $2_4$ (Step S21).

After the execution of Step S19, S20, or S21, the controller 1 exits the forward vehicle rear lamp notification subroutine shown in FIG. 5 and returns to the main routine shown in FIG. 4. That is, the controller 1 proceeds to execution of the traffic light notification subroutine in Step S2.

Figure 6:
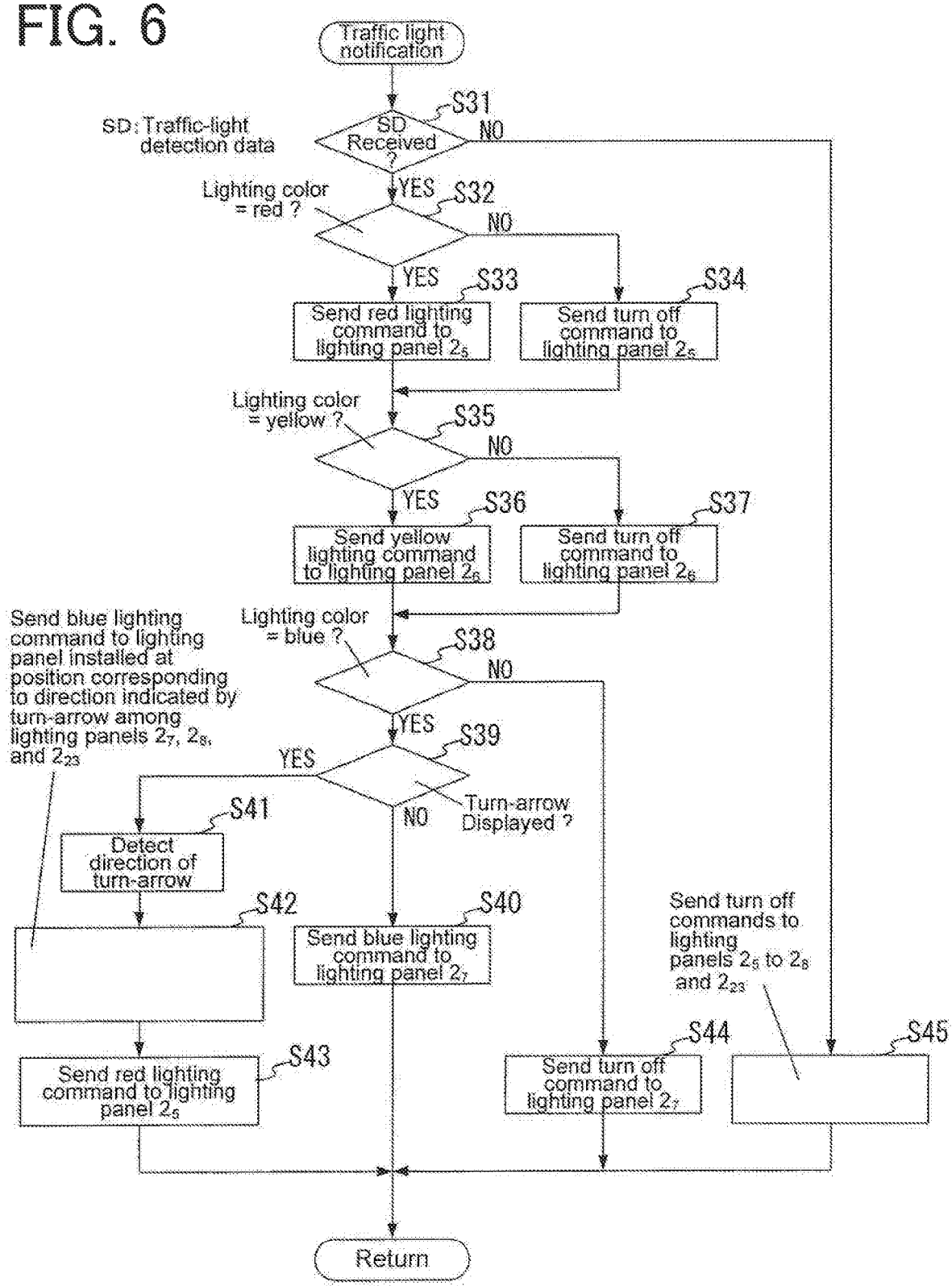
FIG. 6 is a flowchart illustrating a traffic light notification subroutine.

FIG. 6 is a flowchart showing the detail of the traffic light notification subroutine.

In FIG. 6, first, the controller 1 determines whether or not the traffic-light detection data SD is received from the image recognition processor 4 (Step S31). When Step S31 determines that the traffic-light detection data SD is received, that is, when the traffic light exists ahead, then the controller 1 determines whether a lighting color of the traffic light represented by the traffic light detection data SD is red or not (Step S32). When Step S31 determines that the lighting color is red, the controller 1 sends the red lighting command signal to the illumination panel $2_5$ (Step S33). The red lighting command signal causes the illumination panel $2_5$, which is installed at the ceiling above a windshield FG of the vehicle as shown in FIG. 2B, to light in red. On the other hand, when Step S32 determines that the lighting color represented by the traffic-light detection data SD is not red, the controller 1 supplies the turn off command signal to the illumination panel $2_5$ in order to turn off the illumination panel $2_5$ (Step S34). After the execution of Step S33 or S34, the controller 1 determines whether the lighting color of the traffic light represented by the traffic-light detection data SD is yellow or not (Step S35). When Step S35 determines that the lighting color is yellow, the controller 1 supplies a yellow lighting command signal to an illumination panel $2_6$ (Step S36). The yellow lighting command signal causes the illumination panel $2_6$, which is installed on the left of the illumination panel $2_5$ above the windshield of the vehicle as shown in FIG. 2B, to light in yellow. On the other hand, when Step S35 determines that the lighting color represented by the traffic-light detection data SD is not yellow, the controller 1 supplies the turn off command signal to the illumination panel $2_6$ in order to turn off the illumination panel $2_6$ (Step S37). After the execution of Step S36 or S37, the controller 1 determines whether the lighting color of the traffic light represented by the traffic-light detection data SD is blue or not (Step S38). When Step S38 determines that the lighting color is blue, then the controller 1 determines, based on the traffic-light detection data SD, whether the blue lighting indicates a direction with an arrow or not (Step S39). When it is determined in Step S39 that the blue lighting is not an arrow indication, the controller 1 supplies a blue lighting command signal to an illumination panel $2_7$ (Step S40). The blue lighting command signal causes the illumination panel $2_7$, which is installed above the windshield of the vehicle as shown in FIG. 28, to light in blue. On the other hand, when it is determined in Step S39 that the traffic light is an arrow indication, the controller 1 detects (identifies) a pointing direction of the arrow based on the traffic-light detection data SD (Step S41). Next, the controller 1 supplies the blue lighting command signal to that illumination panel, among the illumination panels $2_7$, $2_8$, and $2_{23}$ shown in FIG. 2B, which is located at a position corresponding to the direction pointed by the arrow (Step S42). The blue lighting command signal causes that illumination panel to light in blue. That is, in Step S42, when the direction pointed by the arrow is right, the controller 1 supplies the blue lighting command signal to the illumination panel $2_8$. In Step S42, when the direction pointed by the arrow is left, the controller 1 supplies the blue lighting command signal to the illumination panel $2_7$. In Step S42, when the direction pointed by the arrow is the straight direction, the controller 1 supplies the blue lighting command signal to the illumination panel $2_{23}$. Next, the controller 1 supplies the red lighting command signal to the illumination panel $2_8$ (Step S43). The red lighting command signal causes the illumination panel $2_8$ to light in red. When Step S38 determines that the lighting color of the traffic light represented by the traffic-light detection data SD is not blue, the controller 1 supplies the turn off command signal to the illumination panel 21 in order to turn off the illumination panel $2_7$ (Step S44). When Step S31 determines that the traffic-light detection data SD is not received, the controller 1 supplies the turn off command signal to all the illumination panels $2_5$ to $2_8$ and $2_{23}$ in order to turn off the illumination panels $2_5$ to $2_8$ and $2_{23}$ (Step S45).

After the execution of Step S40, S43, S44, or S45, the controller 1 exits the traffic light notification subroutine shown in FIG. 6 and returns to the main routine shown in FIG. 4. That is, the controller 1 proceeds to execution of the pedestrian/bicycle detection subroutine in Step S3.

Figure 7:
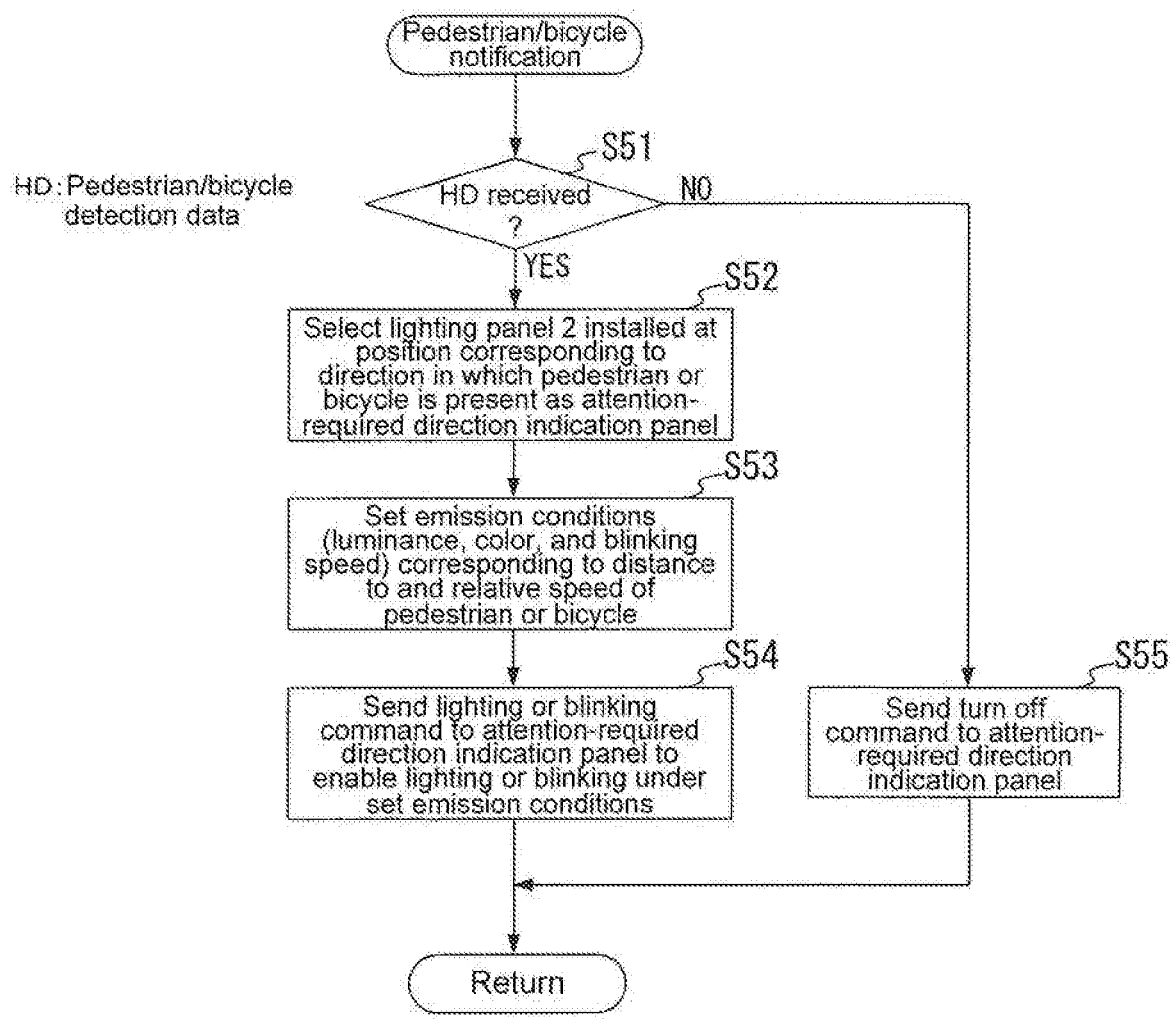
FIG. 7 is a flowchart illustrating a pedestrian/bicycle notification subroutine.

FIG. 7 is a flowchart showing the detail of the pedestrian/bicycle detection subroutine.

In FIG. 7, first, the controller 1 determines whether or not the pedestrian/bicycle detection data HD is received from the image recognition processor 4 (Step S51). When Step S51 determines that the pedestrian/bicycle detection data HD is received, that is, when a pedestrian or a bicycle is present around the vehicle equipped with the surrounding condition detecting system, then the controller 1 selects that illumination panel 2 which is installed at a position corresponding to the direction that the pedestrian or the bicycle is present, as an attention-required direction indication panel (Step S52). The direction of the pedestrian or bicycle is represented by the pedestrian/bicycle detection data HD. The controller 1, for example, selects one illumination panel installed at a position corresponding to the direction of the pedestrian or the bicycle as the attention-required direction indication panel among the illumination panels $2_9$ to $2_{11}$ installed at the door DL on a front passenger seat side and the lighting panels $2_{12}$ to $2_{14}$ installed at the door DR on the driver's seat side of the vehicle as shown in FIG. 2A. That is, in Step S52, the controller 1 selects an illumination panel $2_{12}$ as the attention-required direction indication panel when the direction of the pedestrian or the bicycle is right-front, selects an illumination panel $2_{13}$ when the direction of the pedestrian/bicycle is right-lateral, selects an illumination panel $2_{14}$ when the direction of the pedestrian/bicycle is right-rear, selects an illumination panel $2_9$ when the direction of the pedestrian/bicycle is left-front, selects an illumination panel $2_{10}$ when the direction of the pedestrian/bicycle is left-lateral, and selects an illumination panel $2_{11}$ when the direction of the pedestrian/bicycle is left-rear.

Next, the controller 1 sets emission conditions (luminance, a color, and a blinking speed) corresponding to a distance to and a speed relative to the pedestrian or the bicycle represented by the pedestrian/bicycle detection data HD (Step S53). The emission condition is set, for example, as follows. The smaller the distance to the pedestrian/bicycle, the higher the luminance is. The smaller the distance, the more the emission color transitions from a cool color to a warm color (e.g., purple→indigo→blue→green→yellow→orange→red). The smaller the distance, the higher the blinking speed is. The higher the relative speed, the higher the luminance is. The higher the relative speed, the more the emission color transitions from a cool color to a warm color. The higher the relative speed, the higher the blinking speed is. It should be noted that the above-mentioned emission conditions based on the distance and relative speed may be combined.

Next, the controller 1 supplies the lighting or blinking command signal to the attention-required direction indication panel (Step S54). The lighting or blinking command signal causes the attention-required direction indication panel selected among the illumination panels $2_9$ to $2_{11}$ and $2_{12}$ to $2_{14}$ (FIG. 2A) in Step S52 to light or blink under the emission conditions set in Step S53.

When Step S51 determines that the pedestrian/bicycle detection data HD is not received, the controller 1 supplies the turn off command signal to the attention-required direction indication panel in order to turn off the attention-required direction indication panel (Step S55).

After the execution of Step S54 or S55, the controller 1 exits the pedestrian/bicycle detection subroutine shown in FIG. 7 and returns to the main routine shown in FIG. 4. That is, the controller 1 proceeds to execution of the attention-required zone notification subroutine in Step S4.

Figure 8:
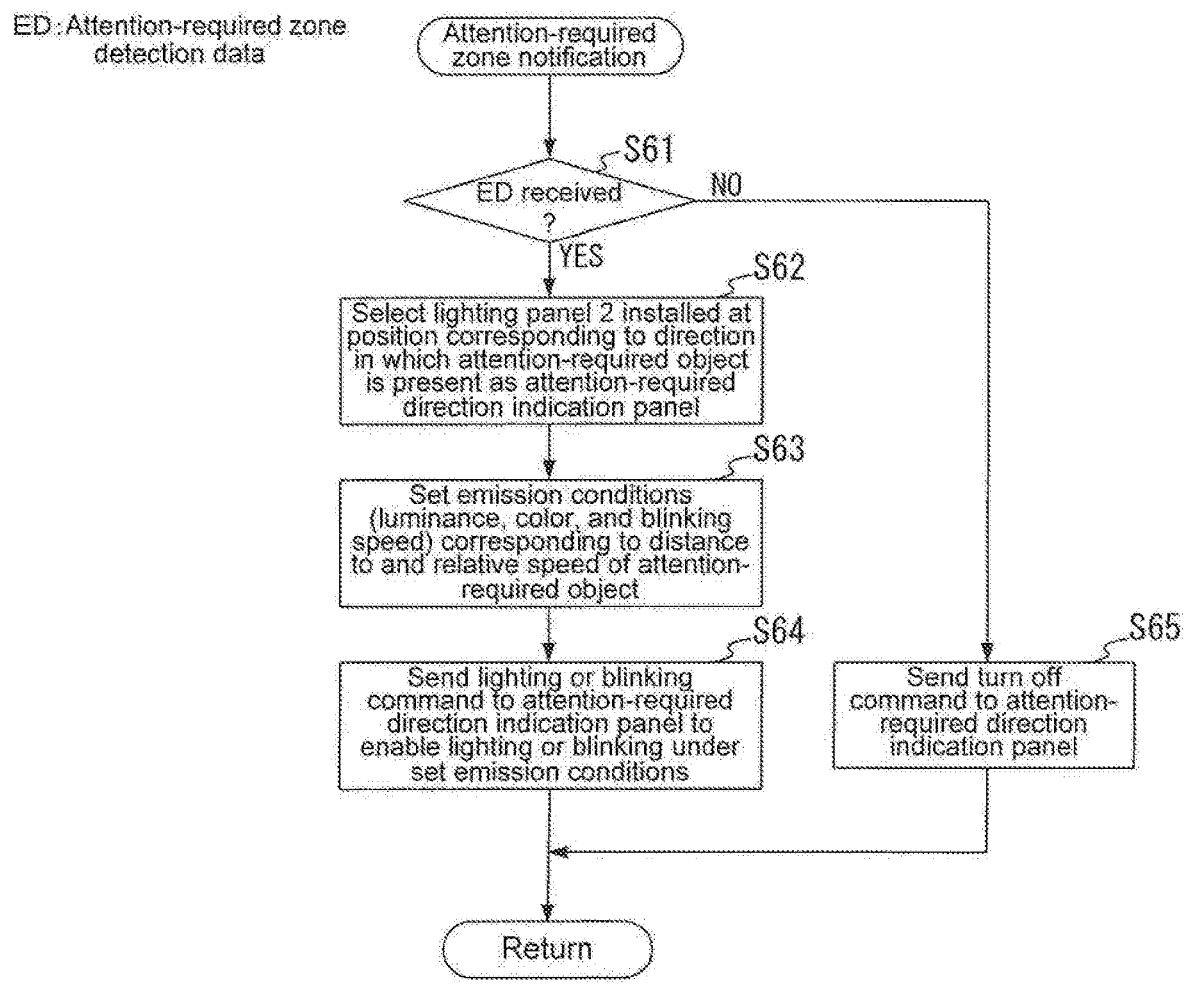
FIG. 8 is a flowchart illustrating an attention-required zone (cautionary zone) notification subroutine.

FIG. 8 is a flowchart illustrating the detail of the attention-required zone notification subroutine.

In FIG. 8, first, the controller 1 determines whether or not the attention-required zone detection data ED is received from the image recognition processor 4 (Step S61). When Step S61 determines that the attention-required zone detection data ED is received, that is, when a road zone with poor visibility is detected and an attention-required object, such as a wall, an edge stone, and a vehicle, is present on the road, then the controller 1 selects that illumination panel 2 which is installed at a position corresponding to the direction that the attention-required object is p resent, which is represented by the attention-required zone detect ion data ED (Step S62). The selected illumination panel 2 is used as an attention-required direction indication panel. The controller 1, for example, selects one illumination panel installed at a position corresponding to the direction that the attention-required object, such as a wall, an edge stone, and a vehicle, is present as the attention-required direction indication panel among the illumination panels $2_9$ to $2_{11}$ installed at the door DL on the front passenger seat side of the vehicle and the illumination panels $2_{12}$ to $2_{14}$ installed at the door DR on the driver's seat side of the vehicle as shown in FIG. 2A. That is, in Step S62, the controller 1 selects the illumination panel $2_{12}$ as the attention-required direction indication panel when the direction of the above-described attention-required object is right front, selects the illumination panel $2_{13}$ when the direction of the attention-required object is right-lateral, selects the illumination panel $2_{14}$ when the direction of the attention-required object is right-rear, selects the illumination panel $2_9$ when the direction of the attention-required object is left-front, selects the illumination panel $2_{10}$ when the direction of the attention-required object is left lateral, and selects the illumination panel $2_{11}$ when the direction of the attention-required object is left-rear.

Next, the controller 1 sets light emission conditions (luminance, a color, and a blinking speed) corresponding to a distance to and a speed relative to the attention-required object represented by the attention-required zone detection data ED (Step S63). The light emission condition is set, for example, as follows. The smaller the distance, the higher the luminance is. The smaller the distance, the more the emission color transitions from a cool color to a warm color (purple→indigo→blue→green→yellow→orange→red). The smaller the distance, the higher the blinking speed is. The higher the relative speed, the higher the luminance is. The higher the relative speed, the more the emission color transitions from a cool color to a warm color. The higher the relative speed, the higher the blinking speed is. It should be noted that the above-described light emission conditions based on the distance and relative speed may be combined.

Next, the controller 1 supplies the lighting or blinking command signal to the attention-required direction (cautionary direction) indication panel (Step S64). The lighting or blinking command signal causes the attention-required direction indication panel, selected among the illumination panels $2_9$ to $2_{11}$ and $2_{12}$ to $2_{14}$ (FIG. 2A) in Step S62, to light or blink under the light emission conditions set in Step S63.

When Step S61 determines that the attention-required zone detection data ED is not received, the controller 1 supplies the turn off command signal to the attention-required direction indication panel in order to turn off the attention-required direction indication panel (Step S65).

After the execution of Step S64 or S65, the controller 1 exits the attention-required zone notification subroutine shown in FIG. 8 and returns to the main routine shown in FIG. 4. Thus, the controller 1 proceeds to execution of the emergency vehicle notification subroutine in Step S5.

Figure 9:
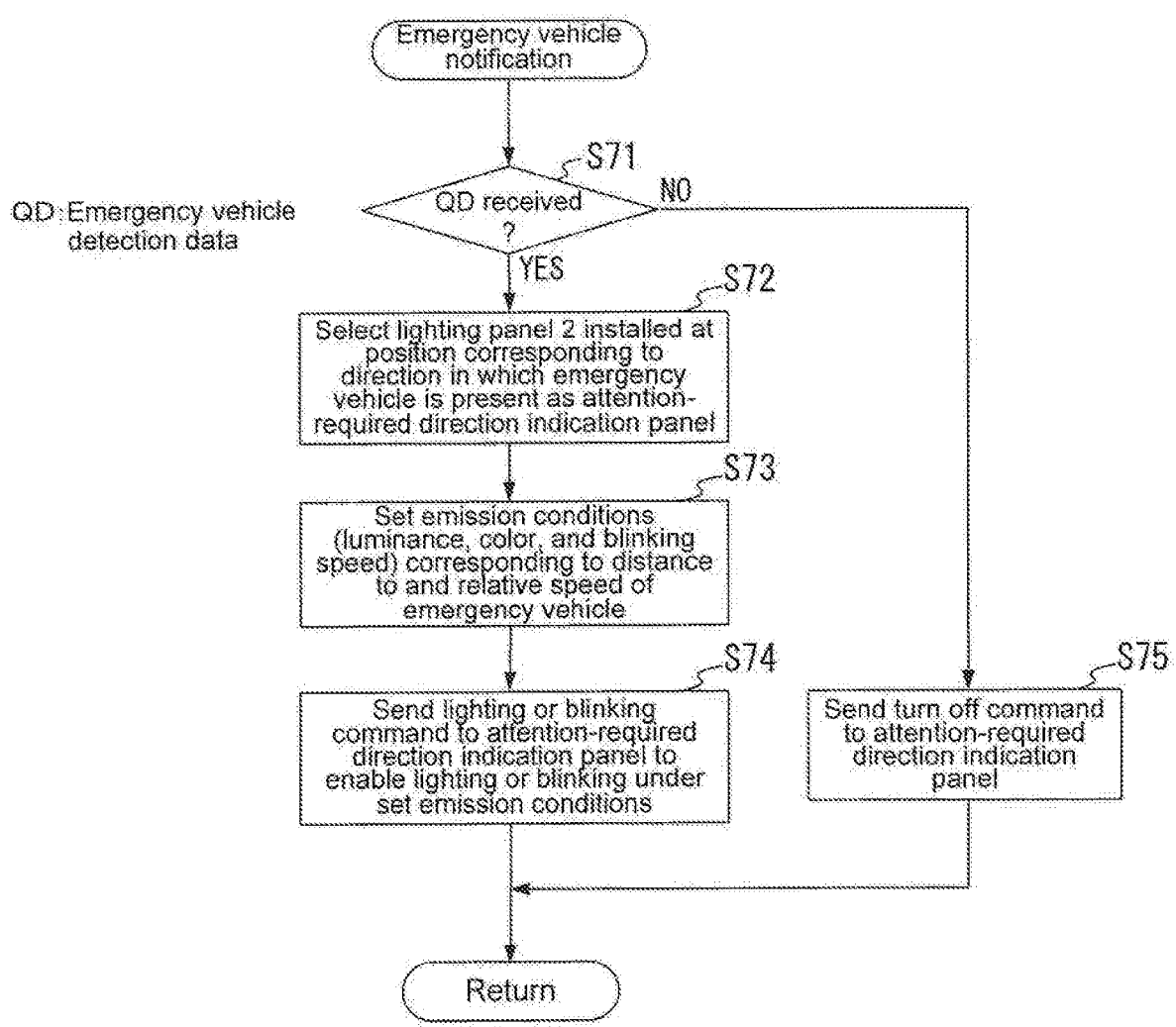
FIG. 9 is a flowchart illustrating an emergency vehicle notification subroutine.

FIG. 9 is a flowchart illustrating the detail of the emergency vehicle notification subroutine.

In FIG. 9, first, the controller 1 determines whether or not the emergency vehicle detection data QD is received from the image recognition processor 4 (Step S71). When Step S71 determines that the emergency vehicle detection data QD is received, that is, when an emergency vehicle is present near the vehicle equipped with the surrounding condition detecting system, then the controller 1 selects that illumination panel 2 which is disposed at a position corresponding to the direction that the emergency vehicle is present, as the attention-required direction indication panel (Step S72). The presence of the emergency vehicle is represented by the emergency vehicle detection data QD. The controller 1, for example, selects one illumination panel disposed at a position corresponding to the direction that the emergency vehicle is present as the attention-required direction indication panel among the illumination panels $2_9$ to $2_{11}$ disposed at the door DL on the front passenger seat side and the illumination panels $2_{12}$ to $2_{14}$ disposed at the door DR on the driver's seat side of the vehicle as shown in FIG. 2A. That is, in Step S72, the controller 1 selects the illumination panel $2_{12}$ as the attention-required direction indication panel when the direction of the emergency vehicle is right-front, selects the illumination panel $2_{13}$ when the direction of the emergency vehicle is right-lateral, selects the illumination panel $2_{14}$ when the direction of the emergency vehicle is right-rear, selects the illumination panel $2_9$ when the direction of the emergency vehicle is left-front, selects the illumination panel $2_{10}$ when the direction of the emergency vehicle is left-lateral, and selects the illumination panel $2_{11}$ when the direction of the emergency vehicle is left-rear.

Next, the controller 1 sets light emission conditions (luminance, a color, and a blinking speed) corresponding to a distance to and a speed relative to the emergency vehicle represented by the emergency vehicle detection data QD (Step S73). The light emission condition is set, for example, as follows. The smaller the distance, the higher the luminance is. The smaller the distance, the more the emission color transitions from a cool color to a warm color (purple→indigo→blue→green→yellow→orange→red). The smaller the distance, the higher the blinking speed is. The higher the relative speed, the higher the luminance is. The higher the relative speed, the more the emission color transitions from a cool color to a warm color. The higher the relative speed, the higher the blinking speed is. It should be noted that the light emission conditions based on the distance and relative speed may be combined.

Next, the controller 1 supplies the lighting or blinking command signal to the attention-required direction indication panel (Step S74). The lighting or blinking command signal causes the attention-required direction indication panel, selected among the light emission panels $2_9$ to $2_{11}$ and $2_{12}$ to $2_{14}$ (FIG. 2A) in Step S72, to light or blink under the light emission conditions set in Step S73.

When Step S71 determines that the emergency vehicle detection data QD is not received, the controller 1 supplies the turn off command signal to the attention-required direction indication panel in order to turn off the attention-required direction indication panel (Step S75).

After the execution of Step S74 or S75, the controller 1 exits the emergency vehicle notification subroutine shown in FIG. 9 and returns to the main routine shown in FIG. 4. That is, the controller 1 proceeds to execution of the obstruction notification subroutine in Step S6.

Figure 10:
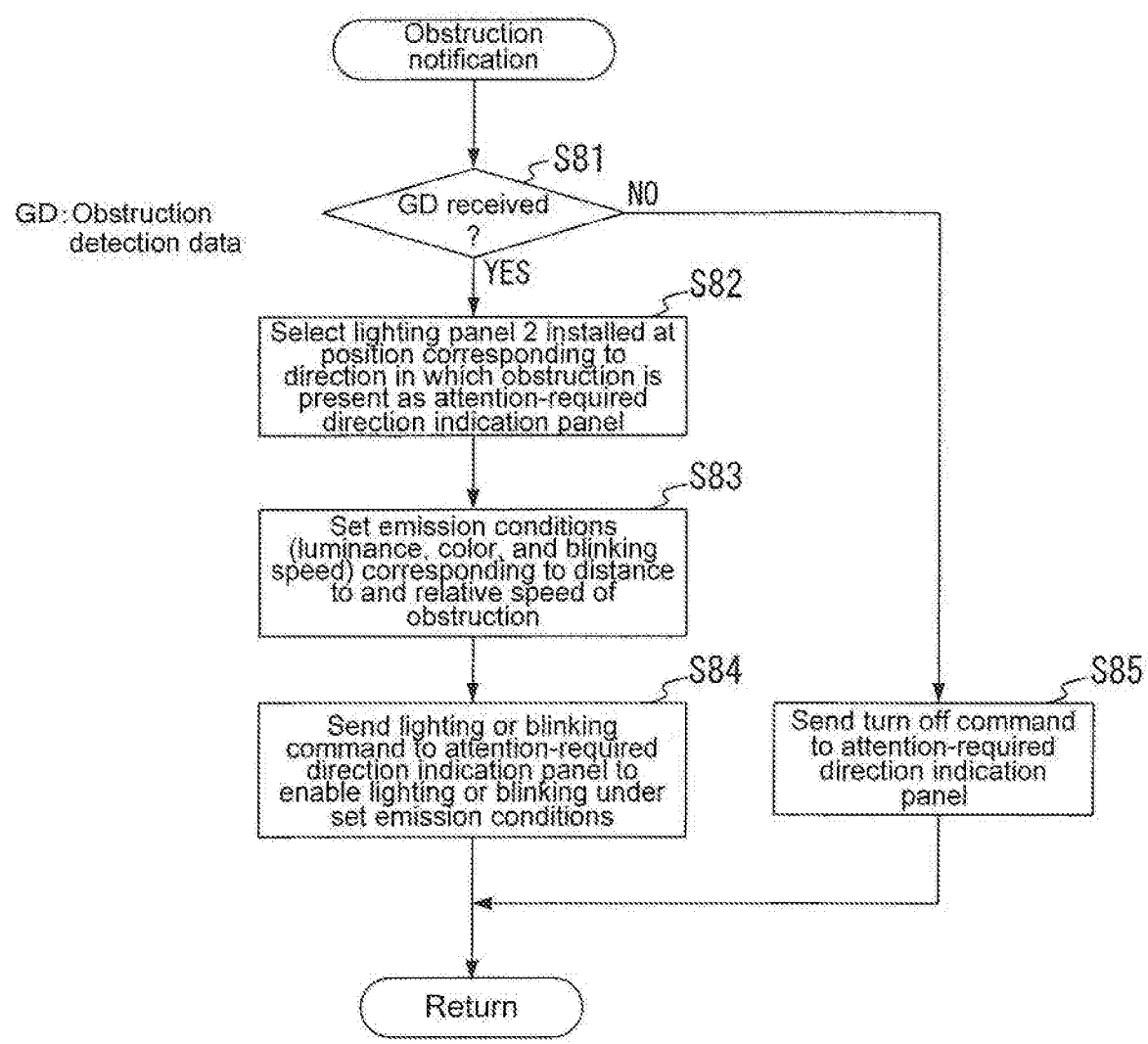
FIG. 10 is a flowchart illustrating an obstacle notification subroutine.

FIG. 10 is a flowchart illustrating the detail of the obstruction notification subroutine.

In FIG. 10, first, the controller 1 determines whether or not the obstruction detection data GD is received from the image recognition processor 4 (Step S81). When Step S81 determines that the obstruction detection data GD is received, i.e., when an obstruction is present around the vehicle equipped with the surrounding condition detecting system, the controller 1 selects that illumination panel 2 which is disposed at a position corresponding to the direction that the obstruction is present, as the attention-required direction indication panel (Step S82). The presence of the obstruction is represented by the obstruction detection data GD. The controller 1, for example, selects one illumination panel disposed at a position corresponding to the direction that the obstruction is present as the attention-required direction indication panel among the illumination panels $2_9$ to $2_{11}$ disposed at the door DL on the front passenger seat side and the illumination panels $2_{12}$ to $2_{14}$ disposed at the door DR on the driver's seat side of the vehicle as shown in FIG. 2A. That is, in Step S82, the controller 1 selects, as the attention-required direction indication panel, the illumination panel $2_{12}$ when the direction of the obstruction is right-front, selects the illumination panel $2_{13}$ when the direction of the obstruction is right-lateral, selects the illumination panel $2_{14}$ when the direction of the obstruction is right-rear, selects the illumination panel $2_9$ when the direction of the obstruction is left-front, selects the illumination panel $2_{10}$ when the direction of the obstruction is left-lateral, and selects the illumination panel $2_{11}$ when the direction of the obstruction is left-rear.

Next, the controller 1 sets light emission conditions (luminance, a color, and a blinking speed) corresponding to a distance to and a size of the obstruction represented by the obstruction detection data GD (Step S83). The light emission condition is set, for example, as follows. The smaller the distance, the higher the luminance is. The smaller the distance, the more the emission color transitions from a cool color to a warm color (purple→indigo→blue→green→yellow→orange→red). The smaller the distance, the higher the blinking speed is. The larger the obstruction size, the higher the luminance is. The larger the obstruction size, the more the emission color is inclined toward a warm color. The larger the obstruction size, the higher the blinking speed is. It should be noted that the light emission conditions based on the distance and size may be combined.

Next, the controller 1 supplies the lighting or blinking command signal to the attention-required direction indication panel (Step S84). The lighting or blinking command signal causes the attention-required direction indication panel, selected among the illumination panels $2_9$ to $2_{11}$ and $2_{12}$ to $2_{14}$ (FIG. 2A) in Step 82, to light or blink under the light emission conditions set in Step S83.

When it is determined in Step S81 that the obstruction detection data GD is not received, then the controller 1 supplies the turn off command signal to the attention-required direction indication panel in order to turn off the attention-required direction indication panel (Step S85).

After the execution of Step S84 or S85, the controller 1 exits the obstruction notification subroutine shown in FIG. 10 and returns to the main routine shown in FIG. 4. That is, the controller 1 proceeds to execution of the forward vehicle rear lamp notification subroutine in Step S1 and repeatedly executes the above-described processing.

Operations and advantages obtained upon execution of the processing shown in FIG. 4 to FIG. 10 will be described.

Figure 11E:
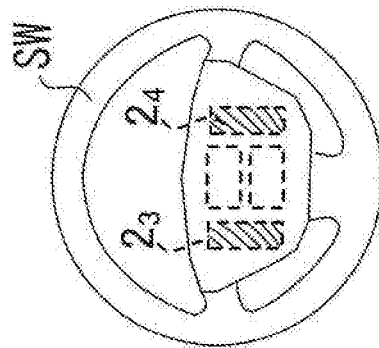
FIG. 11A to FIG. 11E illustrate lighting states of illumination panels $2_1$ to $2_4$ according to a lighting state of a rear lamp assembly of a vehicle traveling forward, respectively.
Figure 11B:
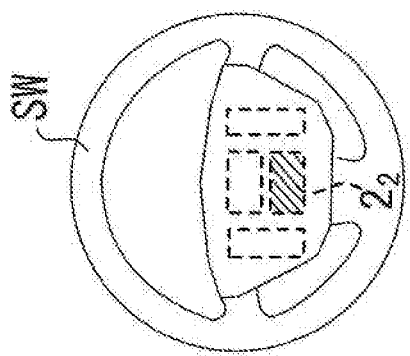
Figure 11D:
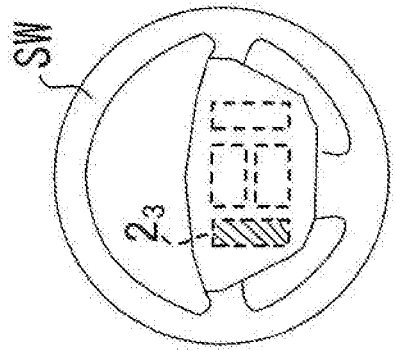
Figure 11A:
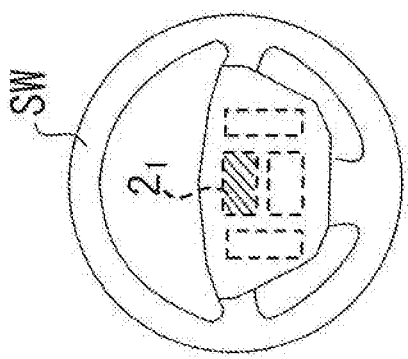
Figure 11C:
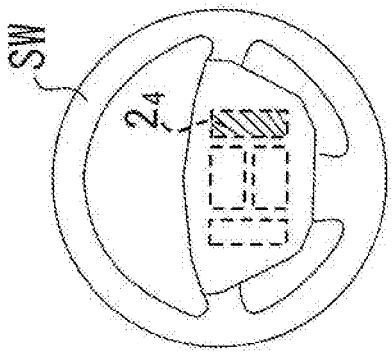

When a stop lamp of a vehicle traveling forward of the vehicle equipped with the surrounding condition detecting system emits a red light, the illumination panel $2_1$ emits a red light in accordance with the lighting stop lamp. The illumination panel $2_1$ is installed at the center of the steering wheel SW, which is a shaded portion in FIG. 11A. When a backup lamp of a vehicle in front of the vehicle equipped with the surrounding condition detecting system emits a white light, the illumination panel $2_2$ emits a white light in accordance with the lighting backup lamp. The illumination panel $2_2$ is installed under the illumination panel $2_1$ of the steering wheel SW, which is a shaded portion in FIG. 11B. When a right turn signal lamp of a vehicle traveling ahead is blinking in yellow, the illumination panel $2_4$ blinks in yellow in accordance with the blinking turn signal lamp. The illumination panel $2_4$ is installed at right lateral to the illumination panel $2_1$ of the steering wheel SW, which is a shaded portion in FIG. 11C. When a left turn signal lamp of the vehicle traveling forward is blinking in yellow, the illumination panel $2_3$ blinks in yellow in accordance with the blinking turn signal lamp. The light-emitting panel $2_3$ is installed at left-lateral to the light-emitting panel $2_1$ of the steering wheel SW, which is a shaded portion in FIG. 11D. When a hazard warning lamp of the vehicle traveling forward is blinking in yellow, the illumination panels $2_3$ and $2_4$ blink in yellow in accordance with the flashing hazard warning lamp. The illumination panels $2_3$ and $2_4$ are installed at left-lateral and right-lateral of the illumination panel $2_1$ of the steering wheel SW, which are shaded portions in FIG. 11E, respectively. Each emission color of the illumination panels $2_1$ to $2_4$ (when the illumination panels $2_1$ to $2_4$ lights or blinks) only needs to be a color similar to the emission color of the lighting rear lamp of the forward vehicle. In other words, the colors of the light emitted from the illumination panels $2_1$ to $2_4$ need not to be completely the same color as the rear lamp assembly of the forward vehicle.

That is, when an image captured by the front camera 3 includes a lighting rear lamp of the forward vehicle, the illumination panels $2_1$ to $2_4$, which are installed at the steering wheel SW, reproduce the lighting or blinking state with a color corresponding to the emission color of the rear lamp assembly of the forward vehicle. Accordingly, even if the driver's visual line is out of the forward vehicle, the lighting/blinking state of the illumination panels $2_1$ to $2_4$ installed at the steering wheel SW enters the driver's field of vision. Thus, even if the driver does not look at the forward vehicle, the driver can recognize a state of the rear lamp assembly of the forward vehicle (the backup lamp, the stop lamp, the turn signal lamp, or the hazard warning lamp) without moving the direction of his visual line. Accordingly, in the case where heavy braking is applied to the forward vehicle while the driver of the vehicle equipped with the surrounding condition detecting system is checking, for example, a traffic sign, the driver of the vehicle equipped with the surrounding condition detecting system can immediately take avoidance behavior.

Figure 12C:
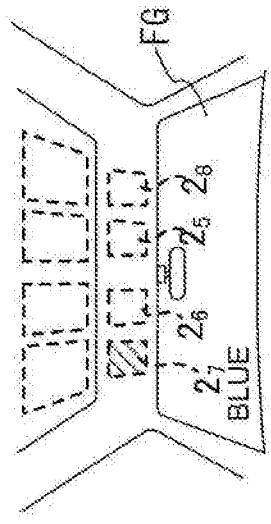
FIG. 12A to FIG. 12F illustrate lighting states of illumination panels $2_5$ to $2_8$ according to a lighting state of a traffic light ahead, respectively.
Figure 12F:
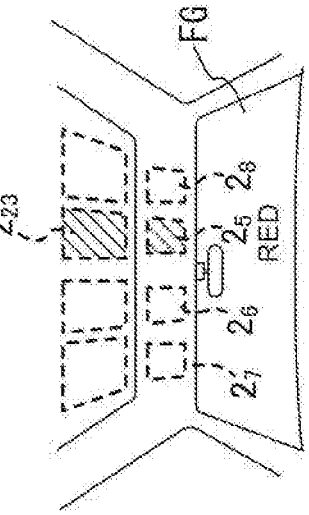
Figure 12B:
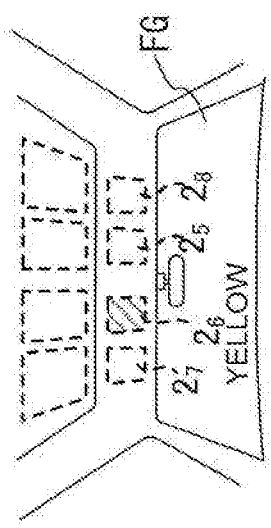
Figure 12E:
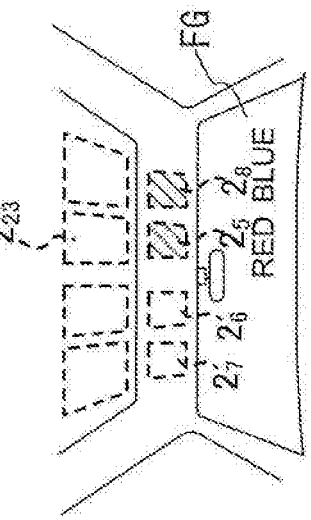
Figure 12A:
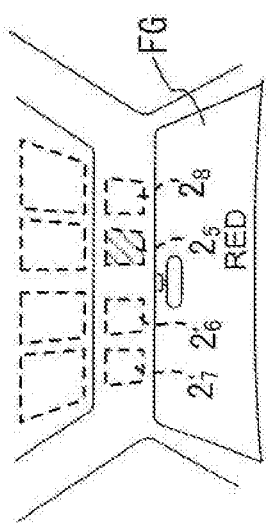
Figure 12D:
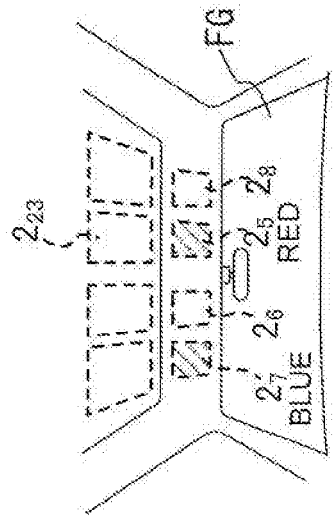

When a traffic light appears forward while the vehicle equipped with the surrounding condition detecting system is traveling, and the emission color of the traffic light is red, then the illumination panel $2_5$ lights in red. The illumination panel $2_5$ is installed above the windshield FG, which is a shaded portion in FIG. 12A. When the emission color of the traffic light is yellow, the illumination panel $2_6$ lights in yellow. The illumination panel $2_6$ is installed above the windshield FG, which is a shaded portion in FIG. 12B. When the emission color of the traffic light is blue (green), the illumination panel $2_7$ lights in blue (green). The illumination panel $2_7$ is installed above the windshield FG, which is a shaded portion in FIG. 12C. When the traffic light displays an arrow pointing leftward, the illumination panel $2_7$ lights in blue and the illumination panel $2_5$ lights in red. The illumination panel $2_7$ is installed above the windshield FG, which is one of shaded portions in FIG. 12D. The illumination panel $2_5$ is installed next to next to the illumination panel $2_7$. The illumination panel $2_5$ is also installed above the windshield FG, which is the other of the shaded portions in FIG. 12D. When the traffic light displays an arrow pointing rightward, the illumination panel $2_8$ lights in blue and the illumination panel $2_5$ lights in red. The illumination panel $2_7$ is installed above the windshield FG, and the illumination panel $2_5$ is laterally next to the illumination panel $2_8$. Both the illumination panels $2_5$ and $2_8$ are shaded portions in FIG. 12E. When the traffic light displays an arrow pointing a straight direction, the illumination panel $2_{23}$ lights in blue and the illumination panel $2_5$ lights in red. The illumination panel $2_{23}$ is installed above the windshield FG, and the illumination panel $2_5$ is disposed below the illumination panel $2_{23}$. The illumination panels $2_5$ and $2_{23}$ are shaded portions in FIG. 12F. That is, combination of blue light from one illumination panel 2 and red light from another illumination panel 2 indicates that a turn arrow display is made by the traffic light. An installation position of the illumination panel 2 that lights in blue indicates a direction to which the vehicle is allowed to move. It should be noted that each emission color of the illumination panels $2_5$ to $2_8$ and $2_{23}$ only needs to be a color corresponding (similar) to the emission color of the traffic light. The emission colors of the illumination panels $2_5$ to $2_8$ and $2_{23}$ need not to be completely the same color as the traffic light.

Thus, when an image captured by the front camera 3 includes the traffic light, the illumination panels $2_5$ to $2_8$ and $2_{23}$, which are installed above the windshield FG in front of the driver's seat, reproduce the lighting state of the traffic light with a color corresponding to the lighting color of the traffic light. Accordingly, even if the driver cannot visually observe a color of the traffic light due to sunlight, the lighting color of the traffic light can be checked. Even if the driver's visual line is out of the traffic light, lighting states of the illumination panels $2_5$ to $2_8$ and $2_{23}$ installed above the windshield FG enters the driver's field of vision. This allows the driver to recognize the color of the traffic light without moving an eye direction of the driver. When the traffic light displays a turn-arrow, the direction of the turn arrow displayed can be recognized by the relationship between a position of one illumination panel 2 that emits a red light and a position of another illumination panel 2 that emits a blue light.

When the avoidance-required obstacle such as a pedestrian, a bicycle, a wall, an edge stone, an obstruction, and an emergency vehicle is present around the vehicle equipped with the surrounding condition detecting system, that illumination panel 2 which is installed at a position corresponding to a direction of the avoidance-required obstacle lights or blinks. For example, when the avoidance-required obstacle is present right front of the vehicle equipped with the surrounding condition detecting system, then the illumination panel $2_{12}$, which is a shaded portion in FIG. 13A, installed on the vehicle front side among the illumination panels $2_{12}$ to $2_{14}$ lights or blinks. The illumination panels $2_{12}$ to $2_{14}$ are situated at the door DR on the driver's seat side. When the avoidance-required obstacle is present right-lateral to the vehicle equipped with the surrounding condition detecting system, then the illumination panel $2_{13}$, which is a shaded portion in FIG. 13B, installed at the center among the illumination panels $2_{12}$ to $2_{14}$ lights or blinks. The illumination panels $2_{12}$ to $2_{14}$ are mounted on the door DR on the driver's seat side. When the avoidance-required obstacle is present left-rear of the vehicle equipped with the surrounding condition detecting system, the illumination panel $2_{11}$, which is a shaded portion in FIG. 13C, installed on the vehicle rear side among the illumination panels $2_9$ to $2_{11}$ lights or blinks. The illumination panels $2_9$ to $2_{11}$ are installed at the door DL on the front passenger seat side. The illumination panel lights or blinks in the following manner. The smaller the distance from the vehicle to the avoidance required obstacle, the higher luminance of the lighting or blinking illumination panel 2 is. The larger the relative speed between the avoidance-required obstacle and the vehicle, the higher luminance of the lighting or blinking illumination panel 2 is. The smaller the distance from the vehicle to the avoidance-required obstacle, the more the emission color transitions from a cool color to a warm color (for example, purple→indigo→blue→green→yellow→orange→red).

The larger the relative speed between the avoidance-required obstacle and the vehicle, the more the emission color transitions from a cool color to a warm color. The smaller the distance from the vehicle to the avoidance-required obstacle, the higher the blinking speed of the blinking illumination panel 2 is. The greater the relative speed between the avoidance-required obstacle and the vehicle, the higher the blinking speed of the blinking illumination panel 2 is. When an obstruction is present on the road, the larger the obstruction size, the higher the luminance of the lighting or blinking illumination panel 2 is. The larger the obstruction size, the emission color of the lighting or blinking illumination panel 2 is inclined toward a warm color. The larger the obstruction size, the higher the blinking speed is.

That is, when an image captured by the front camera 3, the rear camera 5, or the side camera 6 includes the avoidance-required obstacle, i.e., when the avoidance-required obstacle is present near the vehicle equipped with the surrounding condition detecting system, then a state of at least one of the light emitting panels 2 provided in the vehicle cabin is forcibly changed (change from unlit state to lighting or blinking state, changes in emission color or change in luminance). Accordingly, even if the driver of the vehicle equipped with the surrounding condition detecting system does not visually observe the attention-required object around the vehicle equipped with the surrounding condition detecting system, the change in the state of the light emitting panel(s) 2 enters the driver's field of vision. This allows the driver to recognize that the attention required object approaches his vehicle or his vehicle approaches the attention-required object. The light emitting panel 2 installed at a position corresponding to a direction that the attention-required object is present is caused to light or blink (flash). This allows the driver to recognize the direction where the attention-required object (cautionary object) is present without moving the driver's visual line.

Accordingly, even if the avoidance-required obstacle present near the vehicle is out of the driver's field of vision during backward driving, entering a road zone with poor visibility, or exiting a parking area or lot, light (blinking or no blinking) of the luminescence panel 2 located at a position corresponding to a direction of the avoidance-required obstacle enters the driver's field of vision. This enables the driver to recognize the direction where the avoidance-required obstacle is present without moving the driver's visual line. Because the emission color, the luminance, and the blinking speed of the luminescence panel 2 change in accordance with the distance and the relative speed between the vehicle and the avoidance-required obstacle, the driver is able to intuitively recognize danger or hazard associated with the approaching avoidance-required obstacle.

Steps S73 and S74 in the emergency vehicle notification subroutine shown in FIG. 9 are executed with an emergency vehicle as the obstacle. It should be noted, however, that processing similar to Steps S73 and S74 may be carried out with a preceding vehicle as the avoidance-required object. For example, if a distance to the preceding vehicle becomes smaller than a predetermined distance, all of the luminescence lamps $2_1$ to $2_4$ mounted on the steering wheel SW (FIG. 2A) may be used as the attention-required direction indication panels. Then, the processing similar to Steps S73 and S74 are carried out. Accordingly, the smaller the distance to the preceding vehicle, the higher the luminance of each of the luminescence panels $2_1$ to $2_4$ is. The higher the relative speed to the preceding vehicle, the higher the luminance of each of the luminescence panels $2_1$ to $2_4$ is. The smaller the distance to the preceding vehicle, the more the emission color transitions from a cool color to a warm color (for example, purple→indigo→blue→green→yellow→orange→red). The higher the relative speed to the preceding vehicle, the more the emission color transitions from a cool color to a warm color. The smaller the distance to the preceding vehicle, the higher the blinking speed of each of the luminescence panels $2_1$ to $2_4$ is. The higher the relative speed to the preceding vehicle, the higher the blinking speed of each of the luminescence panels $2_1$ to $2_4$ is.

Figure 13A:
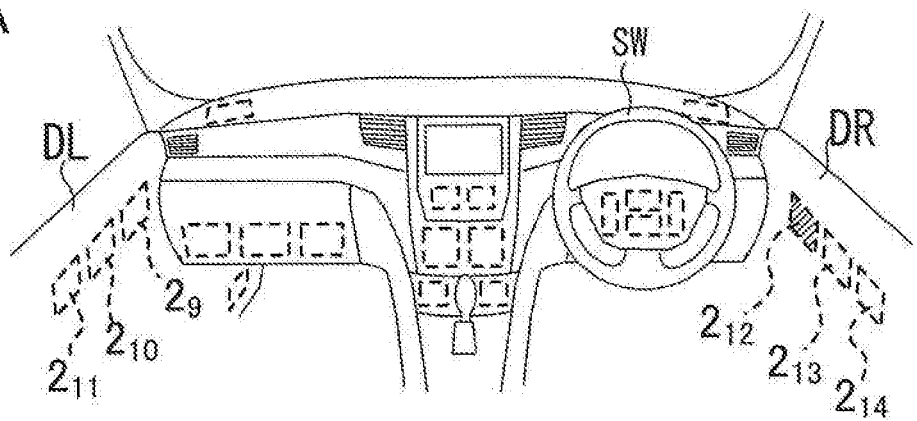
FIG. 13A to FIG. 13C illustrate lighting states of illumination panels $2_9$ to $2_{14}$ when an obstacle-to-avoid is present around the vehicle equipped with the surrounding condition detecting system, respectively.
Figure 13B:
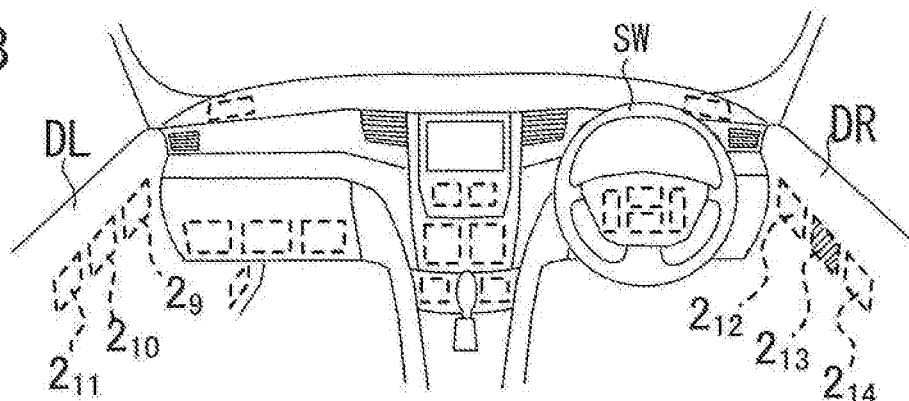
Figure 13C:
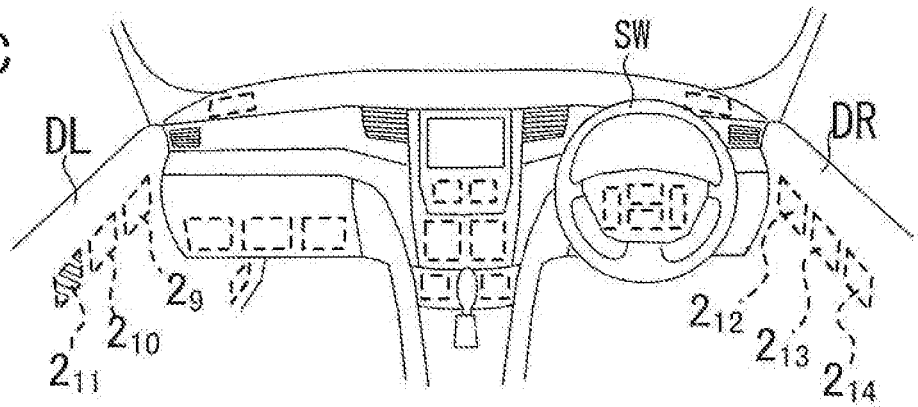

Although in the above-described embodiment, as shown in FIG. 13A to FIG. 13C, the direction of the avoidance-required object is indicated by lighting or blinking of the luminescence panels $2_9$ to $2_{14}$ mounted on the door DR on the d river's seat side and the door DL on the front passenger seat side, the direction of the avoidance required object may be indicated by another luminescence panel(s) 2.

Figure 14A:
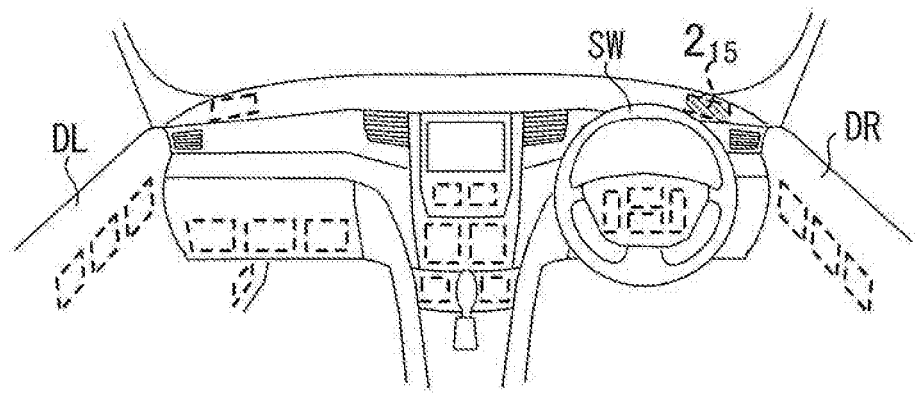
FIG. 14A and FIG. 14B illustrate exemplary lighting states of illumination panels $2_{15}$ and $2_{16}$ when the vehicle equipped with the surrounding condition detecting system enters an intersection with poor visibility.
Figure 14B:
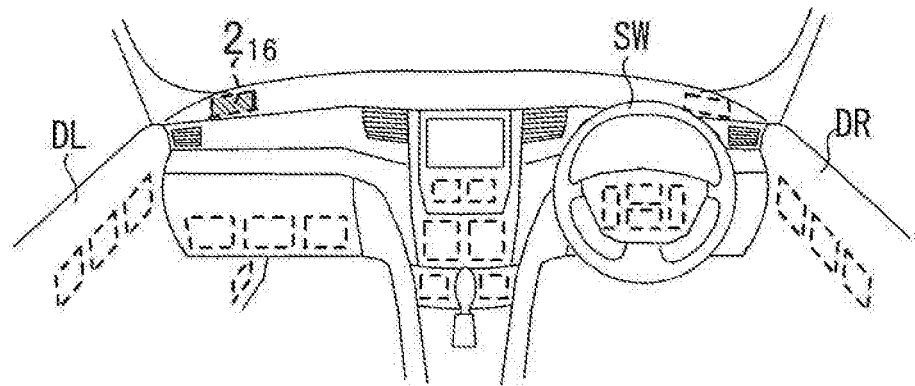

In the case where, for example, an avoidance-required object approaches from rightward of the vehicle equipped with the surrounding condition detecting system at an intersection with poor visibility where entry is from a narrow road without effective right/left visibility into a wide road, a luminescence panel $2_{15}$ mounted on a dashboard on the driver's seat side shown in FIG. 14A is caused to light or blink. When the avoidance-required object approaches from leftward of the vehicle equipped with the surrounding condition detecting system, the luminescence panel $2_{16}$ mounted on the dashboard on the front passenger seat side shown in FIG. 14B may be caused to light or blink. When the avoidance-required object is present right-lateral to the vehicle equipped with the surrounding condition detecting system, the luminescence panel $2_{12}$ mounted on the door DR on the driver's seat side (FIG. 2A) may be caused to light or blink. When the avoidance-required object is present left-lateral to the vehicle, the luminescence panel $2_9$ mounted on the door DL on the front passenger seat side (FIG. 2A) may be caused to light or blink. Similarly, the luminescence panels $2_{17}$ to $2_{22}$ mounted on the ceiling in the vehicle cabin (FIG. 2B) may be caused to light or blink corresponding to a direction of the avoidance-required object. For example, when the avoidance-required object is present at right front of the vehicle equipped with the surrounding condition detecting system, the luminescence panel $2_{17}$ mounted on the ceiling may be caused to light or blink. When the avoidance-required object is present at left-rear of the vehicle, the luminescence panel $2_{22}$ mounted on the ceiling may be caused to light or blink.

DESCRIPTION OF REFERENCE SIGNS 1 controller
$2_1$ to $2_n$ light emitting panels
3 front camera
4 image recognition processor
5 rear camera
6 side cameras

What is claimed is:

1. A system for detecting a surrounding condition relative to a body, the system comprising:
 a light-emitter,
 a sensor configured to detect the surrounding condition; and
 a controller configured to change a state of the light-emitter when the sensor detects a change of a condition at a position forward of the body.

2. The system according to claim 1, wherein the sensor comprises a camera positioned on a front portion of the body.

3. The system according to claim 1, wherein the controller changes a color of the light-emitter according to a distance between an object and the body.

4. The system according to claim 3, wherein the controller translates the color of the light-emitter from a cool color to a warm color as the distance between the object and the body decreases.

5. The system according to claim 3, wherein the cool color is green and the warm color is red.

6. The system according to claim 1, wherein the controller changes the state of the light-emitter to light or blink according to a distance between an object and the body.

7. The system according to claim 1, wherein the sensor further detects a change of a rear lamp of a forward body that is forward of the body.

8. The system according to claim 7, wherein the controller changes the state of the light-emitter to light or blink when the sensor detects rear lamp lights of the forward body.

9. The system according to claim 8, wherein a color of the light-emitter is red.

10. The system according to claim 8, wherein a color of the light-emitter and a color of the rear lamp are the same.

11. A vehicle comprising:
 a light-emitter,
 a sensor configured to detect the surrounding condition; and
 a controller configured to change a state of the light-emitter when the sensor detects a change of a condition at a position forward of the vehicle.

12. The vehicle according to claim 11, wherein the sensor comprises a camera positioned on a front portion of the vehicle.

13. The vehicle according to claim 11, wherein the controller changes a color of the light-emitter according to a distance between an object and the vehicle.

14. The vehicle according to claim 13, wherein the controller translates the color of the light-emitter from a cool color to a warm color as the distance between the object and the body decreases.

15. The vehicle according to claim 13, wherein the cool color is green and the warm color is red.

16. The vehicle according to claim 11, wherein the controller changes the state of the light-emitter to light or blink according to a distance between an object and the body.

17. The vehicle according to claim 11, wherein the sensor detects a change of a rear lamp of a forward vehicle that is forward of the vehicle.

18. The vehicle according to claim 17, wherein the controller changes the state of the light-emitter to light or blink when the sensor detects rear lamp lights of the forward vehicle.

19. The vehicle according to claim 18, wherein a color of the light-emitter is red.

20. The vehicle according to claim 18, wherein a color of the light-emitter and a color of the rear lamp are the same.

* * * * *